United States Patent [19]
Kawatsu et al.

[11] Patent Number: 5,888,653
[45] Date of Patent: *Mar. 30, 1999

[54] HEAT-SENSITIVE MIMEOGRAPH STENCIL

[75] Inventors: Yukio Kawatsu, Kuritagun; Kenji Tsunashima, Kyoto; Katsuya Toyoda, Otsu; Katsutoshi Ando, Otsu; Hideyuki Yamauchi, Otsu; Kenji Kida, Otsu, all of Japan

[73] Assignee: Toray Industries, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 491,915

[22] PCT Filed: Oct. 20, 1994

[86] PCT No.: PCT/JP94/01765

§ 371 Date: Aug. 16, 1995

§ 102(e) Date: Aug. 16, 1995

[87] PCT Pub. No.: WO95/13924

PCT Pub. Date: May 26, 1995

[30] Foreign Application Priority Data

Nov. 17, 1993 [JP] Japan .................................. 5-288332
Jan. 10, 1994 [JP] Japan .................................. 6-000876
Jul. 26, 1994 [JP] Japan .................................. 6-174495

[51] Int. Cl.⁶ ...................................................... B32B 9/00
[52] U.S. Cl. .......................... 428/409; 428/480; 428/141; 428/327; 428/484; 428/195; 428/219; 428/220; 428/311.11; 428/296; 428/910; 428/423.7; 101/114; 101/128.4; 101/93.04
[58] Field of Search ..................... 428/195, 219, 428/220, 286, 288, 289, 291, 296, 311.1, 910, 480, 141, 327, 409, 484; 101/114, 128.4, 93.04

[56] References Cited

U.S. PATENT DOCUMENTS

| | | | |
|---|---|---|---|
| 3,870,593 | 3/1975 | Elton et al. | 161/159 |
| 4,256,784 | 3/1981 | Gebhardt et al. | 428/216 |
| 4,438,167 | 3/1984 | Schwarz | 428/138 |
| 5,011,190 | 4/1991 | Matsuguchi et al. | 283/101 |
| 5,061,565 | 10/1991 | Aoki et al. | 428/409 |
| 5,234,733 | 8/1993 | Schloegl et al. | 428/36.91 |
| 5,407,724 | 4/1995 | Mimura et al. | 428/141 |
| 5,498,464 | 3/1996 | Ikejima et al. | 428/195 |

FOREIGN PATENT DOCUMENTS

| | | |
|---|---|---|
| 0 592 215 A2 | 4/1994 | European Pat. Off. . |
| 48-23865 | 3/1973 | Japan . |
| 49-34985 | 3/1974 | Japan . |
| 59-070600 | 4/1984 | Japan . |
| 5-221175 | 8/1993 | Japan . |
| 2 207 635 | 2/1989 | United Kingdom . |

Primary Examiner—Marion McCamish
Assistant Examiner—Arti Singh
Attorney, Agent, or Firm—Austin R. Miller

[57] ABSTRACT

A heat-sensitive mimeograph stencil having a uniform shape of openings, which have an excellent balance of retention and permeation of printing ink is disclosed.

The heat-sensitive mimeograph stencil includes a polyester film and a porous support made of polyester fibers, which is laminated on the polyester film, wherein the porous support constitutes a network having fused points formed by fusion of the fibers, and that membranes spanning the fibers are formed at some of the fused points, the membranes having thicknesses smaller than average diameter of the fibers. By virtue of this structure, the printed matter obtained by mimeographing using the stencil has high quality and is free from backside transcription. Further, the mimeograph stencil is excellent in ease of transportation.

18 Claims, No Drawings

HEAT-SENSITIVE MIMEOGRAPH STENCIL

TECHNICAL FIELD

The present invention relates to a heat-sensitive mimeograph stencil which is processed by flash irradiation by halogen lamp, xenon lamp or flash bulb, by pulsatory irradiation such as irradiation of infrared or laser beam, or by a thermal head, as well as to a process for producing the same.

BACKGROUND ART

Heat-sensitive mimeograph stencils (hereinafter referred to as "stencils" for short) are known which comprise a thermoplastic film such as acrylonitrile-based film, polyester film, vinylidene chloride film or the like and a porous support such as a tissue paper, a non-woven fabric or a woven fabric, that is made of natural fibers, chemical fibers, synthetic fibers or mixtures thereof, the porous support being adhered to the above-mentioned thermoplastic film (for example, Japanese Laid-open Patent Application (Kokai) Nos. 51-2512, 51-2513 and 57-182495).

However, these conventional stencils have the following drawbacks.

(1) Since the film and the porous support are adhered by using an adhesive, the permeation of ink is hindered by the adhesive, so that clarity of image is low.

(2) As for the adhesive used, for example, acrylic resin-based adhesives and vinyl acetate resin-based adhesives are likely to be softened, swelled and dissolved by printing ink, so that resistance to ink is poor. In case of using a thermosetting adhesive, since non-cured materials are likely to be left over, the stencil is likely to be fused with the thermal head during mimeographing. In the case of using a chlorine-based adhesive, toxic chlorine gas is liberated by heating the thermal head.

(3) Further, in cases where an adhesive is used, an adhering step is necessary in the production process of the stencils, and equipment for recovering a solvent is required because a solvent is used when applying the adhesive. Thus, the cost of the production process is high.

(4) Troubles such as breakage of the film and formation of wrinkles are likely to occur during the adhering step, so that the yield is low.

(5) The adhesive and the solvent make the environment of workers bad. Use of adhesive and solvent is also not preferred in view of protection of the environment of the earth.

To improve these drawbacks, it has been proposed to make the amount of the adhesive used as small as possible (e.g., Japanese Laid-open Patent Application (Kokai) Nos. 58-147396 and 4-232790). However, the above-mentioned drawbacks have not yet been overcome completely.

As a method in which an adhesive is not used, Japanese Laid-open Patent Application (Kokai) No. 4-212891 proposes to form a heat-sensitive mimeograph stencil comprising a thermoplastic resin film and synthetic fibers scattered on one surface of the thermoplastic film, which are bonded to the film by thermocompression bonding. However, with this method, since synthetic fibers having lengths of not more than 50 mm are scattered by blowing wind or by electrostatic force, the fibers are not uniformly scattered, so that permeation of ink is irregular and clarity of image is insufficient. Further, since the adhesion between the resin film and the fiber layer is not necessarily sufficient, wrinkles and breakage are likely to occur during transportation of the film. It has been proposed to blend binder fibers in the fiber layer, or to apply a small amount of a viscose material to the film surface in order to attain complete adhesion. However, if binder fibers or a viscose material are used, permeation of ink is hindered and so clarity of the image is deteriorated. To overcome the drawbacks, it is desired to provide a heat-sensitive mimeograph stencil which does not utilize an adhesive, viscose material or a binder at all.

To promote clarity of image, it is desired that no fiber constituting the support exists at the region at which a hole is formed in order not to hinder permeation of ink. Therefore, it has been proposed to make the amount of the fibers constituting the porous support as small as possible, or to make the thickness of the fibers as small as possible (e.g., Japanese Laid-open Patent Application (Kokai) No. 59-16793). However, if the amount the thickness of the fibers is made small, the strength of the support is decreased, so that ease of transportation of the film is deteriorated. Further, since it is difficult to uniformly disperse the fibers, the basis weight and thickness of the support are irregular, so that permeation of ink is also irregular. As a result, clarity of image is deteriorated. In addition, when printed sheets are stacked, the image is transcribed to the backside of a sheet thereon.

To promote clarity of image and printing resistance, Japanese Laid-open Patent Application (Kokai) No. 2-107488 proposes a heat-sensitive mimeograph stencil comprising a thermoplastic resin film and a non-woven fabric made of synthetic fibers consisting of continuous filaments. However, the balance of retention and permeation of ink is not sufficient.

DISCLOSURE OF THE INVENTION

An object of the present invention is to overcome the above-mentioned various problems of the prior art and to provide a heat-sensitive mimeograph stencil which gives high quality of image and excellent clarity of image, which is free from backside transcription.

Another object of the present invention is to provide a process for producing the above-mentioned heat-sensitive mimeograph stencil.

That is, the present invention provides a heat-sensitive mimeograph stencil comprising a polyester film and a porous support consisting essentially of polyester fibers, which is laminated on the polyester film, characterized in that the porous support constitutes a network having fused points formed by fusion of the fibers, and that membranes spanning the fibers are formed at some of the fused points, the membranes having thicknesses smaller than average diameter of the fibers.

The present invention also provides a process for producing a heat-sensitive mimeograph stencil, characterized in that a non-oriented polyester film and a porous support consisting essentially of non-oriented polyester fibers are bonded by thermocompression bonding and then the laminated polyester film and the porous support are biaxially co-stretched.

By virtue of the above-mentioned constitution, the present invention has the following effects. That is, since a support having a uniform shape of openings can be produced, a stencil having a stable strength and having an excellent balance of retention and permeation of ink is provided. Thus, the printed matter obtained by mimeographing utilizing this stencil has high quality and high clarity of image and is free from backside transcription. Further, the stencil is excellent in ease of transportation.

BEST MODE FOR CARRYING OUT THE INVENTION

The polyester used for forming the polyester film and polyester fibers employed in the present invention is a polyester having as major components an aromatic dicarboxylic acid, aliphatic dicarboxylic acid or alicyclic dicarboxylic acid, and a diol. Examples of the aromatic dicarboxylic acid include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylether dicarboxylic acid, 4,4'-dipheylsulfone dicarboxylic acid and the like. Among these, terephthalic acid, isophthalic acid, 2,6-naphthalene dicarboxylic acid are preferred. Examples of aliphatic dicarboxylic acid include adipic acid, suberic acid, sebacic acid, dodecane dione acid and the like. Among these, adipic acid is preferred. Examples of alicyclic dicarboxylic acid include 1,4-cyclohexane dicarboxylic acid and the like. These acid components may be employed individually or in combination. Further, oxy acids such as hydroxy benzoic acid may be copolymerized as a part of the acid component. Examples of the diol component include ethylene glycol, 1,2-propanediol, 1,3-propanediol, neopentyl glycol, 1,3-butane diol, 1,4-butane diol, 1,5-pentane diol, 1,6 -hexane diol, 1,2-cyclohexane dimethanol, 1,3-cyclohexane dimethanol, 1,4-cyclohexane dimethanol, diethylene glycol, triethylene glycol, polyalkylene glycol, 2,2'-bis(4'-β-hydroxyethoxyphenyl)propane and the like. Among these, ethylene glycol is preferred. These diol components may be employed individually or in combination.

Preferred examples of the polyester used for the polyester film employed in the present invention include polyethylene terephthalates, copolymers of ethylene terephthalate and ethylene isophthalate, copolymers of hexamethylene terephthalate and cyclohexane dimethylene terephthalate and the like. In view of high sensitivity of mimeographing, copolymers of ethylene terephthalate and ethylene isophthalate and copolymers of hexamethylene terephthalate and cyclohexanedimethylene terephthalate are especially preferred.

Preferred examples of the polyester used for the polyester fibers employed in the present invention include polyethylene terephthalates, polyethylene naphthalates, polycyclohexanedimethylene terephthalates, copolymers of ethylene terephthalate and ethylene isophthalate and the like. In view of thermal dimensional stability in mimeographing, polyethylene terephthalates and polyethylene naphthalates are especially preferred.

The polyester used in the present invention may be produced by a known method. For example, the polyester may be produced by directly reacting the acid component and the diol component to carry out an esterification reaction, and then carrying out polycondensation while removing excess diol component by heating the esterification reaction product under reduced pressure. Alternatively, the polyester may be produced by using a dialkyl ester as the acid component and carrying out ester-exchange reaction between the dialkyl ester and the diol component, and then polycondensing the resultant. In this case, as required, as a reaction catalyst, the known catalysts such as alkaline metal compounds, alkaline earth metal compounds, manganese compounds, cobalt compounds, zinc compounds, antimony compounds, germanium compounds and titanium compounds may be employed.

To the polyester employed in the present invention, as required, a fire retardant, thermal stabilizer, anti-oxidant, UV absorber, anti-static agent, pigment, dye, aliphatic acid ester, an organic lubricant such as a wax, a defoaming agent such as polysiloxane may be added.

Further, depending on the use, slipperiness may be promoted. Methods of promoting slipperiness include a method in which inorganic particles such as particles of clay, mica, titanium oxide, calcium carbonate, kaolin, talc, wet or dry silica, or organic particles such as particles of acrylic acids or styrene are added; a method in which non-incorporated particles are utilized, that are generated by precipitation of the catalyst and the like added during the polycondensation reaction process; and a method in which a surfactant is applied.

The porous support employed in the present invention, consisting essentially of polyester fibers, may be produced by known direct melt-spinning methods such as melt-blow method and spun-bond method using the above-described polyester. The intrinsic viscosity of the polyester used is usually and preferably not less than 0.4, more preferably not less than 0.5, still more preferably not less than 0.6.

In the melt-blow spinning method, when melted polyester polymer is extruded from a spinneret, hot air is blown from the circumference of the spinneret, and the extruded polymer is made thin by the hot air. Then the blown fibers are collected on a net conveyer arranged at a prescribed position, thereby forming a web. Since the web is aspirated by an aspirator provided at the net conveyer together with the hot air, the web is collected before the fibers are completely solidified. That is, the web is collected in the state that the fibers constituting the web are fused to each other. By appropriately selecting the collection distance between the spinneret and the net conveyer, the degree of fusion of the fibers may be adjusted. Further, by appropriately adjusting the rate of extrusion of the polymer, temperature of the hot air, rate of blowing the hot air, moving velocity of the conveyer and the like, the basis weight of the web and the fineness of the fibers constituting the web may be arbitrarily controlled. The melt-blow spun fibers are made thin by the pressure of the hot air, so that they are solidified in non-oriented or slightly oriented condition. The thickness of the fibers is not uniform and the web comprises thick fibers and thin fibers which are appropriately dispersed. Since the polymer extruded from the spinneret is rapidly cooled from melted state to room temperature, it is solidified in the state with low crystallinity, which is nearly amorphous.

Similarly, in the spun-bond method, the polymer extruded from a spinneret is drawn by an air ejector and the obtained filament is made to collide with a plate, thereby opening the fiber, followed by collecting the fiber on a conveyer to form a web. By appropriately selecting the rate of extrusion of the polymer and the velocity of the conveyer, the basis weight of the web may be arbitrarily controlled. By appropriately adjusting the pressure and flow rate of the ejector, the state of molecular orientation of the filament may be arbitrarily controlled. By making the pressure and flow rate small, thereby decreasing the spinning rate, a fibrous web having low degree of molecular orientation can be obtained. Further, by controlling the cooling rate of the extruded polymer, a fibrous web having low crystallinity may be obtained. In cases where the fibers are produced by the spun-bond method, the spinning rate of the non-oriented polyester fibers employed in the present invention is preferably not more than 2400 m/min., more preferably not more than 2000 m/min., still more preferably not more than 1800 m/min. If the spinning rate is not more than 2400 m/min., the co-stretching with the film may be well carried out. Although the lower limit of the spinning rate is not restricted, the spinning rate is usually not less than 500 m/min.

The degree of crystallinity of the non-oriented polyester fibers employed in the present invention is usually and preferably not more than 20%, more preferably not more than 15%, still more preferably not more than 10%. If the degree of crystallinity is not more than 20%, the fibers are fused well to each other and a good network is likely to be formed after stretching. Further, the fibers are well fused with the film.

It is most preferred that the non-oriented polyester fibers employed be not stretched at all. Even if they are stretched, it is preferred that the stretching ratio and the degree of orientation are low. Usually, the index of double refraction (Δn) is not more than 0.03, preferably not more than 0.02, still more preferably not more than 0.01. If the index of double refraction is not more than 0.03, the co-stretching with the film can be well attained.

The non-oriented film employed in the present invention may be produced by known methods using the above-described polyester. For example, a non-oriented film may be produced by extruding the polymer onto a casting drum by the T-die extrusion method. By controlling the width of the slit of the die, rate of extrusion of the polymer and rate of revolution of the casting drum, a non-oriented film having a desired thickness may be produced. The intrinsic viscosity of the polyester used for producing the polyester film is usually not less than 0.5, preferably not less than 0.6, still more preferably not less than 0.7. If the intrinsic viscosity is not less than 0.5, stability in film-formation is high, so that a film, especially one having a small thickness, may be cast easily.

Although the polyester film and the porous support consisting essentially of the polyester fibers employed in the present invention may be adhered using a known adhesive, they are preferably fused without using an adhesive. The polyester film and the porous support may be fused by thermocompression bonding, that is, by being directly stacked under heat and under pressure. Although the method of thermocompression bonding is not restricted, in view of ease of process, thermocompression bonding by using heating rolls is best preferred. The thermocompression bonding may be carried out after forming the polyester film and before the stretching in the longitudinal direction, or after the stretching in the longitudinal direction and before the stretching in the transverse direction. The thermocompression bonding temperature is preferably between the glass transition point (Tg) and the melting point (Tm) of the polyester film, more preferably between Tg and cold crystallization temperature (Tcc), still more preferably within the range of Tg+10° C. to Tg+50° C.

In the present invention, it is most preferred to co-stretch the non-oriented polyester film and the non-oriented porous support in the state bonded by thermocompression bonding. By co-stretching the laminate in the state bonded by thermocompression bonding, stretching may be well attained without peeling off of the film and the support. By this, the fibers constituting the support are fused each other at crossing points and contact points, so that a network having fused points is formed. Further, among the fused points, at some fused points, thin membranes spanning the fibers are formed. Thus, by forming the porous support as described above, the strength of the support is stabilized and a porous body having uniform shape of openings can be formed, so that a stencil having well balanced permeation and retention of printing ink can be obtained. Further, by co-stretching the film and the support, since the polyester fibers serve as a reinforcing material, the film is free from breakage, so that film-forming stability is very high.

The method of co-stretching is not restricted and both uniaxial stretching and biaxial stretching are acceptable. However, in view of the orientation of the film and uniform dispersion of the fibers constituting the support, biaxial stretching is preferred. The biaxial stretching may be performed either by sequential biaxial stretching or simultaneous biaxial stretching. In case of sequential biaxial stretching, although it is performed usually by firstly carrying out stretching in the longitudinal direction and then in the transverse direction, this order may be reversed. The stretching temperature may preferably be between the glass transition point (Tg) of the polyester film and the cold crystallization temperature (Tcc). The stretching ratios are not restricted and may be appropriately selected based on the type of the polymer constituting the polyester film and the sensitivity demanded to the stencil. Usually, the stretching ratios in the longitudinal and transverse directions are respectively 2–8 times the original length, preferably 3–7 times the original length. After the biaxial stretching, the laminate may be re-stretched in the longitudinal or transverse direction, or both.

Thereafter, the stencil according to the present invention after the biaxial stretching may be heat set. The heat set temperature is not restricted and may be appropriately selected depending on the type of the polymer constituting the polyester film. Usually, heat set is carried out preferably at 100°–240° C. for 0.5–60 seconds.

The stencil after heat set may be aged at a relatively low temperature of 40°–90° C. for 5 minutes to 1 week, after once cooling the stencil to about room temperature. Such an aging is especially preferred since curling and wrinkles are unlikely to be formed during storage or in a printing machine.

The porous support constituting the stencil according to the present invention forms a network having fused points which are formed by fusion of the fibers at crossing points and contact points. Characteristically, at some of the fused points, thin membranes which span at least 2 fibers are formed. By forming a network of the fibers constituting the support, that has fused points at which thin membranes are formed, the strength of the support is stabilized and uniform shape of openings is attained, so that a stencil having good ease of transportation and has well balanced retention and permeation of printing ink may be provided.

The thin membranes at the fused points in the present invention are those in the form of "webfoot of duck" or "webfoot of frog" or "pleats", which are formed such that they span usually not less than 2 fibers, the thicknesses of the membranes being smaller than the average diameter of the fibers. Although the area of the thin membranes is not restricted, usually the area is not less than 1 $\mu m^2$, preferably not less than 5 $\mu m^2$. Although the upper limit of the area of the thin membranes is not restricted, it is usually and preferably not more than 50,000 $\mu m^2$.

In the present invention, it is not necessary that the thin membranes in the form of "webfoot of duck", "webfoot of frog" or "pleats" be formed at all of the fused points. The thin membranes are formed in the number of, usually and preferably, not less than 1, more preferably not less than 5, still more preferably not less than 10 per 1 $mm^2$ in an ordinary plane of the support. If the number of the fused points at which the thin membranes are formed is not less than 1 per 1 $mm^2$, the strength of the support is high and the shape of the openings of the support is uniform, so that not only retention of ink is high and the clarity of the printed image is good, but also the backside transcription is unlikely to occur when the printed sheets are stacked. Further, ease of transportation of the stencil is good.

The percentage of the area of openings in the support, which is determined by directly observing the surface of the support of the stencil according to the present invention by the light field transmission method with an optical microscope, is usually 5–80%, preferably 10–50%, still more preferably 10–30%. If the percentage of the area of openings is not less than 5%, the permeation of ink is high and if it is not more than 80%, retention of ink is good. When the openings observed by the light field transmission method with an optical microscope are regarded as circles, the average of the equivalent circle diameter is preferably 5–100 µm, more preferably 10–60 µm, still more preferably 10–30 µm. If the average diameter is not less than 5 µm, permeation of ink is high, and if it is not more than 100 µm, retention of ink is good.

The basis weight of the porous support constituting the stencil according to the present invention is usually 2–20 g/m$^2$, preferably 2–16 g/m$^2$, more preferably 2–14 g/m$^2$. If the basis weight is not more than 20 g/m$^2$, permeation of ink is high and the clarity of image is good. If the basis weight is not less than 2 g/m$^2$, retention of ink is good and sufficient strength as a support may be obtained.

The fineness of the polyester fibers constituting the porous support according to the present invention is usually 0.01–10 deniers, preferably 0.1–10 deniers, more preferably 0.1–2 deniers. If the fineness is not more than 10 deniers, the thickness and basis weight of the support are likely to be uniform, so that permeation of ink is uniform. On the other hand, if the fineness is not less than 0.01 denier, sufficient strength as a support can be obtained. It should be noted that the finess of the polyester fibers herein means the average fineness of the support.

The fibers constituting the porous support employed in the present invention may have the same fineness or the fibers may be a mixture of fibers having different finenesses. Further, the porous support may have a multilayer structure in which layers formed by fibers having different finenesses are laminated. In case of the multilayer structure, it is preferred to form the layer contacting the film with fibers having a fineness of not more than 1 denier and to form other layers with fibers having a fineness of not less than 1 denier, in view of the balance of clarity of image and strength of the support. In the case of the multilayer structure, it is preferred that the layer contacting the film have a basis weight of 1–5 g/m$^2$.

It is especially preferred that the fibers constituting the porous support employed in the present invention be oriented by stretching. The index of double refraction ($\Delta$n) of the fibers is usually not less than 0.1, preferably not less than 0.12, still more preferably not less than 0.14. If the index of double refraction is not less than 0.1, the strength of the fibers is high and sufficient strength of the support is obtained.

The degree of crystallinity of the fibers constituting the porous support employed in the present invention is usually and preferably not less than 20%, more preferably not less than 30%, still more preferably not less than 35%. If the degree of crystallinity is not less than 20%, a heat resistance which is sufficient as a support is obtained.

It is especially preferred that the polyester film constituting the stencil according to the present invention be a biaxially oriented film. Although the film thickness may be appropriately selected depending on the sensitivity demanded to the stencil and the like, the thickness is usually 0.1–10 µm, preferably 0.1–5.0 µm, still more preferably 0.1–3.0 µm. If the thickness is not more than 10 µm, hole-opening property is not deteriorated, and if it is not less than 0.1 µm, the stability in film-formation is good.

The polyester film constituting the stencil according to the present invention preferably has an energy of crystal fusion ($\Delta$Hu) of 3–11 cal/g, more preferably 5–10 cal/g. If $\Delta$Hu is not less than 3 cal/g, the shape of opened holes is stable so that clear printing of characters may be easily attained. If $\Delta$Hu is not more than 11 cal/g, non-penetrated holes are not formed in the film, so that deletion of printed characters is prevented and expression of shade and light in paint printing is not deteriorated.

The melting point (Tm1) of the polyester film constituting the stencil according to the present invention is preferably not higher than the melting point (Tm2) of the polyester fibers constituting the porous support. More preferably, the difference in melting points is not less than 5° C., still more preferably not less than 20° C. If Tm1$\leq$Tm2, the hole-opening property of the film is good and the heat resistance of the support is sufficient.

The peeling strength between the polyester film and the porous support constituting the stencil according to the present invention is preferably not less than 1 g/cm, more preferably not less than 5 g/cm, still more preferably not less than 10 g/cm. If the peeling strength is not less than 1 g/cm, wrinkles and breakage of the film are unlikely to occur, so that the stability in film-formation is excellent.

In the present invention, to prevent fusion with a thermal head or the like, a releasing agent may be applied to another surface of the polyester film, after bonding the polyester film and the porous support consisting essentially of the polyester fibers by thermocompression bonding and before, after or during the biaxial stretching.

As the releasing agent, known releasing agents such as silicone oils, silicone resins, fluorine-contained resins, surfactants and the like may be used. However, the following releasing agent is especially preferred.

That is, a releasing agent comprising as a major component a mixture of a petroleum wax (A), plant wax (B) and an oily substance (C), is especially preferred. The term "major component" means that the mixture of the above-mentioned (A), (B) and (C) is contained in an amount of not less than 50%, preferably not less than 60% based on weight.

Examples of the petroleum wax include paraffin wax, microcrystalline wax, oxidized wax and the like. Among these, use of oxidized wax is especially preferred.

Examples of the plant wax include candelilla wax, carnauba wax, Japan wax, Oricury wax, sugar cane wax and the like. In the present invention, the following composition is especially preferred.

That is, an ester adduct of the following compound: {rosin or disproponated rosin, or hydrogenated rosin.$\alpha,\beta$-substituted ethylene ($\alpha$ substituent: carboxyl, $\beta$ substituent: hydrogen, methyl or carboxyl)adduct}.alkyl or alkenyl ($C_1$—$C_8$ respectively) poly(number of repeating units: 1–6) alcohol, is especially preferred.

The mixing ratio of the petroleum wax and the plant wax is preferably 10/90—90/10% by weight, more preferably 20/80—80/20% by weight, still more preferably 30/70—70/30% by weight. The content of the plant wax is preferably not less than 10% by weight because the mixture is uniformly dispersed when it is emulsified or suspended in water, so that a uniform coating layer may be obtained. The content of the petroleum wax is preferably not less than 10% by weight because slipperiness of the coating layer is good and the running property during high speed processing is good.

In the present invention, a mixture containing, in addition to the above-mentioned petroleum wax (A) and the plant wax (B), an oily substance is employed. The oily substance herein means an oil which is in the form of liquid or paste at room temperature. Examples of the oily substances include plant oils, fats and oils, mineral oils, synthetic lubricants and the like. Examples of the plant oils include linseed oil, kaya oil, safflower oil, soybean oil, Chinese tung oil, sesame oil, corn oil, rapeseed oil, bran oil, cotton seed oil, olive oil, sasanqua oil, tsubaki oil, castor oil, peanut oil, palm oil, coconut oil and the like. Examples of the fats and oils include beef tallow, pig oil, sheep oil, cacao butter and the like. Examples of the mineral oils include machine oil, insulating oil, turbin oil, motor oil, gear oil, cutting oil, liquid paraffin and the like. As the synthetic lubricating oil, any lubricating oil which is synthesized may be arbitrarily employed. Examples thereof include olefin-polymerized oils, diester oils, polyalkylene glycol oils, silicone oils, halogenated hydrocarbon oils and the like. Among the above-mentioned oils, mineral oils and synthetic lubricating oils are preferred. The oil may be a mixture of these oils.

It is preferred to add the above-described oily substance (C) in an amount of 1–100 parts by weight, more preferably 3–50 parts by weight per 100 parts by weight of the mixture of the above-mentioned petroleum wax (A) and plant wax (B). If the above-mentioned content of the oily substance is not less than 1 part by weight, the running property when a high energy is applied is good. If it is not more than 100 parts by weight, the running property when a low energy is applied is good.

If a mixture of the plant wax, petroleum wax and the oily substance is employed, a uniform coating membrane is more easily obtained than in the cases where one of these is used alone, so that the running property is good and sticking is unlikely to occur.

To the above-mentioned composition, various additives may be added in an amount not adversely affecting the effects of the present invention. Examples of such additives include anti-static agents, thermal stabilizers, anti-oxidants, organic and inorganic particles, pigments and the like.

To the coating composition, to promote dispersion in water, various additives such as dispersion aids, surfactants, antiseptics, defoaming agents and the like may be added.

The thickness of the releasing agent layer is preferably not less than 0.005 μm and not more than 0.4 μm, more preferably not less than 0.01 μm and not more than 0.4 μm. If the thickness of the releasing agent layer is not more than 0.4 μm, the running property when holes are formed is good and staining of the head is small. If the thickness is not less than 0.005 μm, good releasing property may be attained.

The coating liquid used for forming the releasing agent layer is preferably an aqueous solution, emulsion or suspension in view of pollution of environment and anti-explosion.

The method of coating on the film may be carried out by known coating methods such as the methods using roll coater, gravure coater, reverse coater or bar coater.

As required, before applying the releasing agent, corona discharge treatment may be performed in the air or in various atmosphere on the surface on which the releasing agent is applied.

Methods for measuring and evaluating characteristics relating to the present invention will now be described.

(1) Melting Point (Tm, °C.)

Using a differential scanning calorimeter RDC220 commercially available from Seiko Instruments Inc., 5 mg of a sample was heated from room temperature at a rate of 20° C./min., and endothermic curve was plotted. The melting point was determined from the peak temperature in the endothermic curve.

(2) Energy of Crystal Fusion (ΔHu)

Using a differential scanning calorimeter RDC220 commercially available from Seiko Instruments Inc., the energy of crystal fusion is determined from the prescribed area when the film is melted. By heating a sample, the endothermic curve is shifted to the endothermic side and by continuing the heating, the endothermic curve returns to the base line. The above-mentioned area (a) is the area sandwiched between the endothermic curve from the point at which fusion is initiated with the point at which the fusion is terminated, and the base line. The area (a) is determined by connecting the point at which fusion is initiated with the point at which the fusion is terminated by a straight line. Under the same DSC conditions, In (indium) is subjected to the measurement, and the area (b) is taken as 6.8 cal/g. The energy of crystal fusion is calculated from the following equation.

$$6.8 \times a/b = \Delta Hu \text{ (cal/g)}$$

(3) Fineness (denier)

Ten electron micrographs of 10 arbitrary sites of a sample were taken at a magnification of ×2000. Diameters of arbitrary 15 fibers per one photograph were measured and this was done for the 10 photographs, thereby measuring diameters of totally 150 fibers. Taking the density as 1.38 g/cm$^3$, the finenesses were determined, and the fineness was expressed in terms of the average thereof.

(4) Basis Weight (g/m$^2$)

A piece sizing 20 cm×20 cm was sampled and the weight thereof was measured. The measured weight was converted to the weight per m$^2$.

(5) Intrinsic Viscosity (η)

After drying a sample at 105° C. for 20 minutes, 6.8±0.005 g was weighed and the sample was dissolved in o-chlorophenol at 160° C. for 15 minutes under stirring. After cooling, the viscosity at 25° C. was measured by an automatic viscometer AVM-10S commercially available from Yamato Labotech.

(6) Degree of Crystallinity (%)

A sample was placed in a density gradient tube comprising a mixture of n-heptane and tetrachloromethane, and the density was read after not less than 10 hours from the placement of the sample. The degree of crystallinity was calculated taking the density of the sample whose degree of crystallinity is 0% as 1.335 g/cm$^3$ and that of the sample whose degree of crystallinity is 100% as 1.455 g/cm$^3$.

(7) Index of Double Refraction (Δn)

Using a polarization microscope employing sodium lamp as the light source, retardation was determined by the Berek's compensator method in which the sample is immersed in α-bromonaphthalene, and index of double refraction was calculated therefrom.

(8) Formation and Number of Thin Membranes at Fused Points

A sample was observed with an optical microscope at a magnification of ×100 to ×400. Further, the sample was observed with a scanning electron microscope DS130 commercially available from Topcon at a magnification of ×100 to ×300, and the number of the fused points at which the thin membranes were formed was counted.

(9) Percentage of Area of Openings in Support

The surface of the support of the stencil was directly observed by the light field transmission method with an optical microscope. Using a High Vision-compatible image analyzer commercially available from Pierce, the percentage of area of the openings was determined at a monitor magnification of ×240. The percentage of area of the openings was determined at 0 arbitrary points, and the percentage of area of the openings is expressed in terms of the average thereof.

(10) Average (μm) of Equivalent Circle Diameters of Openings in Support

The surface of the support of the stencil was directly observed by the light field transmission method with an optical microscope. Using a High Vision-compatible image analyzer commercially available from Pierce, the equivalent circle diameters of the openings were measured at a monitor magnification of ×240 after reversing black and white, and the average thereof was calculated. This operation was carried out at 10 arbitrary points, and the average of equivalent circle diameters of openings in the support is expressed in terms of the average thereof.

(11) Peeling Strength (g/cm)

The film was backed with a cellophane tape and the peeling strength between the film and the porous support was measured by the 180° peeling test according to JIS-K-6854.

(12) Evaluation of Printing Performance

An original carrying characters of JIS level 1 having a size of 2.0 mm×2.0 mm or 5.0 mm×5.0 mm and symbols of ● (circles painted in black) having a diameter of 2–10 mm, as well as rulings of different thicknesses was printed by using the prepared stencil. The stencil was processed by a mimeograph "LITHOGRAPH (RC115)" (manufactured by RISO KAGAKU KYOGO K.K).

The quality of the printed image was evaluated by gross examination according to the following criteria.

<Clarity of Characters>

Those by which the characters are clear were classified into "⊚", those by which the characters are slightly unclear were classified into "○", those by which the characters are unclear but legible were classified into "Δ", and those by which the characters are unclear and illegible were classified into "×".

<Irregularity in Thickness of Rulings>

Those by which the thicknesses of the rulings are uniform were classified into "⊚", those by which the thicknesses of the rulings are slightly non-uniform were classified into "○", those by which the thicknesses of the rulings are non-uniform and the rulings are fading were classified into "Δ", and those by which the rulings are cut were classified into "×".

<White Spots in Regions Painted in Black>

Those by which no white spots are formed in the regions painted in black were classified into "⊚", those by which a very small white spot is formed in the regions painted in black were classified into "○", those by which a white spot is clearly observed in the regions painted in black were classified into "Δ", and those by which a large white spot is observed in the regions painted in black were classified into "×".

<Backside Transcription>

Those by which no backside transcription was observed at all were classified into "⊚", those by which backside transcription was slightly observed were classified into "○", those by which backside transcription is clearly observed were classified into "Δ", and those by which backside transcription is severe were classified into "×".

(13) Evaluation of Ease of Transportation

A prepared stencil was supplied to a mimeograph "LITHOGRAPH (RC115)" (manufactured by RISO KAGAKU KYOGO K.K) and mimeographed. The existence of wrinkles of the stencil on the mimeograph body was evaluated by gross examination according to the following criteria.

Those with which no wrinkles are formed at all in the stencil on the mimeograph body were classified into "⊚", those with which wrinkles of not more than 1 mm are formed were classified into "○", those with which wrinkles of 1–5 mm are formed were classified into "Δ", those with which wrinkles of not less than 5 mm are formed were classified into "×".

EXAMPLE 1

Using a rectangular spinneret having 100 holes with a diameter of 0.35 mm, polyethylene terephthalate material ($(\eta)$=0.6, Tm=257° C.) was spun by the melt-blow method at a spinneret temperature of 280° C. and an extrusion rate of 30 g/min. The fibers were collected on a conveyer at a distance of 15 cm and wound to prepare a non-oriented non-woven fabric having a basis weight of 80 g/m$^2$. The average fineness of this non-woven fabric was 2 deniers, the degree of crystallinity was 5% and the index of double refraction (Δn) was 0.005.

Then a copolymerized polyester resin material ($(\eta)$=0.7, Tm=228° C.) containing 86 mol % of polyethylene terephthalate and 14 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 80° C. The thus obtained laminated sheet was stretched in the longitudinal direction at a stretching ratio of 3 times the original length by heating rolls at 90° C. and then stretched in the transverse direction at 95° C. at a stretching ratio of 3.5 times the original length in a tenter type stretcher. The resultant was heat set in the tenter at 160° C. for 5 seconds to obtain a heat-sensitive mimeograph stencil having a thickness of 30 μm. To the film surface of the stencil, a wax-based releasing agent was applied at the entrance of the tenter with a gravure coater in an amount of 0.1 g/m$^2$ in terms of dry weight. The basis weight of the fibers of the obtained stencil was 5.5 g/m$^2$ and the average fineness was 0.67 deniers. The thickness of the film alone was 2 μm and the energy of crystal fusion was 7.7 cal/g. The stencil was observed with an optical microscope. The support was in the form of a network in which the fibers were fused to each other and thin membranes spanning the fibers were formed at some of the fused points. The obtained stencil was examined for the number of thin membranes and the various printing characteristics by the methods described above. The results are shown in Table 1.

EXAMPLE 2

Using the same spinneret as used in Example 1, polyethylene naphthalate material ($(\eta)$=0.5, Tm=272° C.) was spun by the melt-blow method at a spinneret temperature of 300° C. to obtain a non-oriented woven fabric having a basis weight of 80 g/m$^2$. The average fineness of this non-woven fabric was 2.2 deniers, the degree of crystallinity was 8% and the index of double refraction (Δn) was 0.006.

Then a copolymerized polyester resin material as used in Example 1, containing 86 mol % of polyethylene terephthalate and 14 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 100° C. to prepare a laminated sheet.

The thus obtained laminated sheet was stretched in the longitudinal direction at a stretching ratio of 3 times the original length by heating rolls at 110° C. and then stretched in the transverse direction at 110° C. at a stretching ratio of 3.5 times the original length in a tenter type stretcher. The resultant was heat set in the tenter at 160° C. for 5 seconds to obtain a heat-sensitive mimeograph stencil having a thickness of 35 μm. To the film surface of the stencil, a wax-based releasing agent was applied at the entrance of the tenter with a gravure coater in an amount of 0.1 g/m² in terms of dry weight.

The basis weight of the fibers of the obtained stencil was 6 g/m² and the average fineness was 0.65 deniers. The thickness of the film alone was 2 μm and the energy of crystal fusion was 7.8 cal/g. The stencil was observed with an optical microscope. The support was in the form of a network in which the fibers were fused each other and thin membranes spanning the fibers were formed at some of the fused points. The obtained stencil was examined for the number of thin membranes and the various printing characteristics by the methods described above. The results are shown in Table 1.

EXAMPLE 3

Using a rectangular spinneret having 1000 holes with a diameter of 0.25 mm, polyethylene terephthalate material (($\eta$)=0.65, Tm=254° C.) was extruded at a spinneret temperature of 290° C. The extruded fibers were dispersed and collected on a conveyer at a spinning rate of 2000 m/min using an air ejector to prepare a slightly oriented non-woven fabric having a basis weight of 100 g/m². The average fineness of this non-woven fabric was 4 deniers, the degree of crystallinity was 8% and the index of double refraction ($\Delta$n) was 0.009.

Then a copolymerized polyester resin material as used in Example 1, containing 86 mol % of polyethylene terephthalate and 14 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 90° C. to prepare a laminated sheet.

The thus obtained laminated sheet was stretched in the longitudinal direction at a stretching ratio of 3 times the original length by heating rolls at 95° C. and then stretched in the transverse direction at 95° C. at a stretching ratio of 3.5 times the original length in a tenter type stretcher. The resultant was heat set in the tenter at 160° C. for 5 seconds to obtain a heat-sensitive mimeograph stencil having a thickness of 60 μm. To the film surface of the stencil, a wax-based releasing agent was applied at the entrance of the tenter with a gravure coater in an amount of 0.1 g/m² in terms of dry weight.

The basis weight of the fibers of the obtained stencil was 10 g/m² and the average fineness was 1.44 deniers. The thickness of the film alone was 2 μm and the energy of crystal fusion was 7.5 cal/g. The stencil was observed with an optical microscope. The support was in the form of a network in which the fibers were fused each other and thin membranes spanning the fibers were formed at some of the fused points. The obtained stencil was examined for the number of thin membranes and the various printing characteristics by the methods described above. The results are shown in Table 1.

EXAMPLE 4

The non-woven fabric having a basis weight of 100 g/m² prepared in Example 3 was provided.

Then a copolymerized polyester resin material containing 75 mol % of polyethylene terephthalate and 25 mol % of polyethylene isophthalate (($\eta$)=0.72, Tm=195° C.) was extruded from a T-die of an extruder having a screw diameter of 40 mm at a die temperature of 270° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 90° C. to prepare a laminated sheet.

The thus obtained laminated sheet was stretched in the longitudinal direction at a stretching ratio of 3 times the original length by heating rolls at 95° C. and then stretched in the transverse direction at 95° C. at a stretching ratio of 3.5 times the original length in a tenter type stretcher. The resultant was heat set in the tenter at 160° C. for 5 seconds to obtain a heat-sensitive mimeograph stencil having a thickness of 60 μm. To the film surface of the stencil, a wax-based releasing agent was applied at the entrance of the tenter with a gravure coater in an amount of 0.1 g/m² in terms of dry weight.

The basis weight of the fibers of the obtained stencil was 8 g/m² and the average fineness was 1.4 deniers. The thickness of the film alone was 2 μm and the energy of crystal fusion was 5.9 cal/g.

The stencil was observed with an optical microscope. The support was in the form of a network in which the fibers were fused to each other and thin membranes spanning the fibers were formed at some of the fused points. The obtained stencil was examined for the number of thin membranes and the various printing characteristics by the methods described above. The results are shown in Table 1.

EXAMPLE 5

The non-woven fabric having a basis weight of 100 g/m² prepared in Example 3 was provided.

Then a copolymerized polyester resin material containing 30 mol % of polyhexamethylene terephthalate and 70 mol % of 1,4-cyclohexanedimethanol (($\eta$)=0.75, Tm=197° C.) was extruded from a T-die of an extruder having a screw diameter of 40 mm at a die temperature of 240° C. The extruded sheet was cast onto a cooling drum having a diameter of 300 mm to prepare a non-oriented film. On this non-oriented film, the non-woven fabric prepared as described above was overlaid and the obtained laminate was thermally bonded by supplying the laminate to heating rolls having a temperature of 50° C. to prepare a laminated sheet.

The thus obtained laminated sheet was stretched in the longitudinal direction at a stretching ratio of 3 times the original length by heating rolls at 55° C. and then stretched in the transverse direction at 60° C. at a stretching ratio of 3.5 times the original length in a tenter type stretcher. The resultant was heat set in the tenter at 120° C. for 5 seconds to obtain a heat-sensitive mimeograph stencil having a thickness of 60 μm. To the film surface of the stencil, a wax-based releasing agent was applied at the entrance of the tenter with a gravure coater in an amount of 0.1 g/m² in terms of dry weight.

The basis weight of the fibers of the obtained stencil was 9 g/m² and the average fineness was 1.4 deniers. The thickness of the film alone was 2 μm and the energy of crystal fusion was 8.5 cal/g.

The stencil was observed with an optical microscope. The support was in the form of a network in which the fibers were fused to each other and thin membranes spanning the fibers were formed at some of the fused points. The obtained stencil was examined for the number of thin membranes and the various printing characteristics by the methods described above. The results are shown in Table 1.

EXAMPLE 6

A non-woven fabric (non-woven fabric A) having a basis weight of 20 g/m² was prepared by employing the same material and the same spinning conditions as in Example 1.

Similarly, a non-woven fabric (non-woven fabric B) having a basis weight of 80 g/m² was prepared by employing the same material and the same spinning conditions as in Example 3.

Then a copolymerized polyester resin material as used in Example 1, containing 86 mol % of polyethylene terephthalate and 14 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric A and the non-woven fabric B prepared as described above were overlaid in the order mentioned and the obtained laminate was subjected to thermocompression bonding by supplying the laminate to heating rolls having a temperature of 90° C. to prepare a laminated sheet. The thus obtained laminated sheet was stretched in the longitudinal direction at a stretching ratio of 3.5 times the original length by heating rolls at 95° C. and then stretched in the transverse direction at 95° C. at a stretching ratio of 3.5 times the original length in a tenter type stretcher. The resultant was heat set in the tenter at 160° C. for 5 seconds to obtain a heat-sensitive mimeograph stencil having a thickness of 50 μm. To the film surface of the stencil, a wax-based releasing agent was applied at the entrance of the tenter with a gravure coater in an amount of 0.1 g/m² in terms of dry weight. The basis weight of the fibers of the obtained stencil was 12 g/m². The thickness of the film alone was 2 μm and the energy of crystal fusion of the film was 7.7 cal/g. The fineness of the non-woven fabric A was 0.65 deniers and the fineness of the non-woven fabric B was 1.44 deniers. The basis weight of the non-woven fabric A contacting the film was 1.8 g/m².

The stencil was observed with an optical microscope. The support was in the form of a network in which the fibers were fused each other and thin membranes spanning the fibers were formed at some of the fused points. The obtained stencil was examined for the number of thin membranes and the various printing characteristics by the methods described above. The results are shown in Table 1.

EXAMPLE 7

The non-woven fabric prepared in Example 1, which had a basis weight of 80 g/m² was provided. This non-woven fabric was stretched by a stretcher at a stretching ratio of 4 times the original length in both the longitudinal and transverse directions. The resultant was heat set at 160° C. for 1 minute to obtain a porous support having an average fineness of 0.5 deniers and a basis weight of 5 g/m².

Then from a copolymerized polyester resin material as used in Example 1, containing 86 mol % of polyethylene terephthalate and 14 mol % of polyethylene isophthalate, a biaxially oriented polyester film having a thickness of 2 μm was prepared. The above-mentioned porous support and this polyester film were attached by using a vinyl acetate resin. The amount of the applied adhesive was 1 g/m². To the film surface, a wax-based releasing agent was applied in an amount of 0.1 g/m² in terms of dry weight, to obtain a heat-sensitive mimeograph stencil.

The stencil was observed with an optical microscope. The support was in the form of a network in which the fibers were fused to each other and thin membranes spanning the fibers were formed at some of the fused points. However, there were a number of regions scattered, which were clogged by the adhesive. The obtained stencil was examined for the number of thin membranes and the various printing characteristics by the methods described above. The results are shown in Table 1.

COMPARATIVE EXAMPLE 1

Using a rectangular spinneret having 1000 holes with a diameter of 0.25 mm, polyethylene terephthalate material ($(\eta)$=0.65, Tm=254° C.) was extruded at a spinneret temperature of 290° C. The extruded fibers were dispersed and collected on a conveyer at a spinning rate of 3500 m/min using an air ejector to prepare a non-woven fabric having a basis weight of 100 g/m². The non-woven fabric was calendered at 130° C. to prepare a porous support.

The average fineness of this non-woven fabric was 2.2 deniers, the degree of crystallinity was 30% and the index of double refraction ($\Delta$n) was 0.09.

Then a copolymerized polyester resin material as used in Example 1, containing 86 mol % of polyethylene terephthalate and 14 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film. On this non-oriented film, the non-woven fabric prepared as described above was overlaid and the obtained laminate was thermally bonded by supplying the laminate to heating rolls having a temperature of 90° C. to prepare a laminated sheet.

The thus obtained laminated sheet was stretched in the longitudinal direction at a stretching ratio of 2.0 times the original length by heating rolls at 95° C. and then stretched in the transverse direction at 95° C. at a stretching ratio of 2.5 times the original length in a tenter type stretcher. The resultant was heat set in the tenter at 160° C. for 5 seconds to obtain a heat-sensitive mimeograph stencil having a thickness of 60 μm. To the film surface of the stencil, a wax-based releasing agent was applied at the entrance of the tenter with a gravure coater in an amount of 0.1 g/m² in terms of dry weight.

The basis weight of the fibers of the obtained stencil was 10 g/m² and the average fineness was 1.4 deniers. The thickness of the film alone was 2 μm. The stencil was observed with an optical microscope. The support constituted by the fibers was "see-through" and the fibers were scattered in the form of cotton substantially without being fused to each other. The thin membranes were not formed. Further, the fibers were apart from the film surface. The obtained stencil was examined for the number of thin membranes and the various printing characteristics by the methods described above. The results are shown in Table 1.

COMPARATIVE EXAMPLE 2

Using a rectangular spinneret having 1000 holes with a diameter of 0.25 mm, polyethylene terephthalate material ((η)=0.65, Tm=254° C.) was spun at a spinneret temperature of 290° C. and at an extrusion rate of 1000 g/min. The extruded fibers were dispersed and collected on a conveyer at a spinning rate of 5000 m/min using an air ejector to prepare a non-woven fabric having a basis weight of 15 g/m².

The non-woven fabric was pressed with an embossed roll at 220° C. to prepare a porous support.

The average fineness of this non-woven fabric was 3 deniers, the degree of crystallinity was 45% and the index of double refraction (Δn) was 0.17.

Then from a copolymerized polyester resin material as used in Example 1, containing 86 mol % of polyethylene terephthalate and 14 mol % of polyethylene isophthalate, a biaxially oriented polyester film having a thickness of 2 μm was prepared.

The above-mentioned porous support and this polyester film were attached by using a vinyl acetate resin. The amount of the applied adhesive was 1 g/m². To the film surface, a wax-based releasing agent was applied in an amount of 0.1 g/m² in terms of dry weight.

The obtained stencil was observed with an optical microscope. Although the fibers constituting the support were regularly to fused together at the sites pressed by the embossed portions, the thin membranes at the fused points were not formed at all. The obtained stencil was examined for the number of thin membranes and the various printing characteristics by the methods described above. The results are shown in Table 1.

COMPARATIVE EXAMPLE 3

A tissue paper comprising 100% natural fibers made of Manila hemp having a basis weight of 10 g/m² and the polyester film having a thickness of 2 μm prepared in Comparative Example 2 were attached by using a vinyl acetate resin. The amount of the applied adhesive was 1 g/m². To the film surface, a wax-based releasing agent was applied in an amount of 0.1 g/m² in terms of dry weight to prepare a heat-sensitive mimeograph stencil. The obtained stencil was examined for the various printing characteristics by the methods described above. The results are shown in Table 1.

COMPARATIVE EXAMPLE 4

A non-oriented non-woven fabric having a basis weight of 80 g/m² was prepared by the same method as in Example 1 except that pressure of the hot air was little increased and the collection distance was 30 cm. The average fineness of this non-woven fabric was 1.8 deniers, the degree of crystallinity was 21% and the index of double refraction was 0.032. Then the non-woven fabric was subjected to thermocompression bonding with the non-oriented film and the resultant was biaxially oriented under the same conditions as in Example 1 to prepare a heat-sensitive mimeograph stencil. The stencil was observed with an optical microscope. The support constituted by the fibers was "see-through" and the fibers were scattered in the form of cotton substantially without being fused to each other. The thin membranes were not formed. The obtained stencil was examined for the various printing characteristics by the methods described above. The results are shown in Table 1.

EXAMPLE 8

Using a rectangular spinneret having 100 holes with a diameter of 0.35 mm, polyethylene terephthalate material ((η)=0.48, Tm=258° C.) was spun by the melt-blow method at a spinneret temperature of 290° C. and at a hot air temperature of 295° C. The fibers were collected on a net conveyer to prepare a non-oriented non-woven fabric having an average fineness of 0.25 deniers and a basis weight of 200 g/m². The degree of crystallinity of the non-woven fabric was 6% and the index of double refraction (Δn) was 0.006.

Then a copolymerized polyester resin material ((η)=0.68, Tm=224° C.) containing 85 mol % of polyethylene terephthalate and 15 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 80° C. The thus obtained laminated sheet was stretched in the longitudinal direction at a stretching ratio of 4 times the original length by heating rolls at 90° C. and then stretched in the transverse direction at 95° C. at a stretching ratio of 5 times the original length in a tenter type stretcher. The resultant was heat set in the tenter at 150° C. for 5 seconds to obtain a heat-sensitive mimeograph stencil. To the film surface of the stencil, a wax-based releasing agent was applied at the entrance of the tenter with a gravure coater in an amount of 0.1 g/m² in terms of dry weight. The average fineness of the obtained stencil was 0.05 deniers, and the energy of crystal fusion of the film was 7.9 cal/g. The stencil was observed with an optical microscope. The support was in the form of a network in which the fibers were fused to each other and thin membranes spanning the fibers were formed at some of the fused points. The obtained stencil was examined for the number of thin membranes and the various printing characteristics by the methods described above. The results are shown in Table 2.

EXAMPLE 9

A non-oriented non-woven fabric having a basis weight of 350 g/m² was prepared under the same conditions as in Example 8. Then a heat-sensitive mimeograph stencil was prepared under the same conditions as in Example 8. The stencil was observed with an optical microscope. The support was in the form of a network in which the fibers were fused to each other and thin membranes spanning the fibers were formed at some of the fused points. The obtained stencil was examined for the number of thin membranes and the various printing characteristics by the methods described above. The results are shown in Table 2.

EXAMPLES 10–13

Using a rectangular spinneret having 100 holes with a diameter of 0.35 mm, polyethylene terephthalate material (($\eta$)=0.48, Tm=258° C.) was spun by the melt-blow method at a spinneret temperature of 290° C. and at a hot air temperature of 295° C. The fibers were collected on a net conveyer to prepare non-oriented non-woven fabrics having an average fineness of 0.5 deniers and basis weights of 60 g/m$^2$ (Example 10), 140 g/m$^2$ (Example 11), 200 g/m$^2$ (Example 12) and 350 g/m$^2$ (Example 13), respectively. The degree of crystallinity of the non-woven fabrics was 6% and the index of double refraction ($\Delta$n) was 0.006.

Then a copolymerized polyester resin material (($\eta$)=0.68, Tm=224° C.) containing 85 mol % of polyethylene terephthalate and 15 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 80° C. The thus obtained laminated sheet was stretched in the longitudinal direction at a stretching ratio of 3.8 times the original length by heating rolls at 90° C. and then stretched in the transverse direction at 95° C. at a stretching ratio of 4.5 times the original length in a tenter type stretcher. The resultant was heat set in the tenter at 155° C. for 5 seconds to obtain heat-sensitive mimeograph stencils of Examples 10–13. To the film surface of each of the stencils, a wax-based releasing agent was applied at the entrance of the tenter with a gravure coater in an amount of 0.1 g/m$^2$ in terms of dry weight. The average fineness of the obtained stencils was 0.12 deniers, and the energy of crystal fusion of the film was 7.9 cal/g. The stencils were observed with an optical microscope. The supports were in the form of a network in which the fibers were fused to each other and thin membranes spanning the fibers were formed at some of the fused points. The obtained stencils were examined for the number of thin membranes and the various printing characteristics by the methods described above. The results are shown in Table 2.

EXAMPLES 14–16

Using a rectangular spinneret having 100 holes with a diameter of 0.35 mm, polyethylene terephthalate material (($\eta$)=0.48, Tm=258° C.) was spun by the melt-blow method at a spinneret temperature of 290° C. and at a hot air temperature of 295° C. The fibers were collected on a net conveyer to prepare non-oriented non-woven fabrics having an average fineness of 0.8 deniers and basis weights of 60 g/m$^2$ (Example 14), 120 g/m$^2$ (Example 15) and 160 g/m$^2$ (Example 16), respectively. The degree of crystallinity of the non-woven fabrics was 6% and the index of double refraction ($\Delta$n) was 0.006.

Then a copolymerized polyester resin material (($\eta$)=0.68, Tm=224° C.) containing 85 mol % of polyethylene terephthalate and 15 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 80° C. The thus obtained laminated sheet was stretched in the longitudinal direction at a stretching ratio of 4.0 times the original length by heating rolls at 95° C. and then stretched in the transverse direction at 95° C. at a stretching ratio of 4.0 times the original length in a tenter type stretcher. The resultant was heat set in the tenter at 160° C. for 5 seconds to obtain heat-sensitive mimeograph stencils of Examples 14–16. To the film surface of each of the stencils, a wax-based releasing agent was applied at the entrance of the tenter with a gravure coater in an amount of 0.1 g/m$^2$ in terms of dry weight. The average fineness of the obtained stencils was 0.22 deniers, and the energy of crystal fusion of the film was 7.9 cal/g. The stencils were observed with an optical microscope. The supports were in the form of a network in which the fibers were fused to each other and thin membranes spanning the fibers were formed at some of the fused points. The obtained stencils were examined for the number of thin membranes and the various printing characteristics by the methods described above. The results are shown in Table 2.

EXAMPLES 17–19

Using a rectangular spinneret having 100 holes with a diameter of 0.35 mm, polyethylene terephthalate material (($\eta$)=0.48, Tm=258° C.) was spun by the melt-blow method at a spinneret temperature of 290° C. and at a hot air temperature of 295° C. The fibers were collected on a net conveyer to prepare non-oriented non-woven fabrics having an average fineness of 1.0 denier and basis weights of 40 g/m$^2$ (Example 17), 80 g/m$^2$ (Example 18) and 120 g/m$^2$ (Example 19), respectively. The degree of crystallinity of the non-woven fabrics was 6% and the index of double refraction ($\Delta$n) was 0.006.

Then a copolymerized polyester resin material (($\eta$)=0.68, Tm=224° C.) containing 85 mol % of polyethylene terephthalate and 15 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 80° C. The thus obtained laminated sheet was stretched in the longitudinal direction at a stretching ratio of 3.2 times the original length by heating rolls at 85° C. and then stretched in the transverse direction at 90° C. at a stretching ratio of 3.6 times the original length in a tenter type stretcher. The resultant was heat set in the tenter at 165° C. for 5 seconds to obtain heat-sensitive mimeograph stencils of Examples 17–19. To the film surface of each of the stencils, a wax-based releasing agent was applied at the entrance of the tenter with a gravure coater in an amount of 0.1 g/m$^2$ in terms of dry weight. The average fineness of the obtained stencils was 0.29 deniers, and the energy of crystal fusion of the film was 7.9 cal/g. The stencils were observed with an optical microscope. The supports were in the form of a network in which the fibers were to fused each other and thin membranes spanning the fibers were formed at some of the fused points. The obtained stencils were examined for the number of thin membranes and the various printing characteristics by the methods described above. The results are shown in Table 2.

EXAMPLE 20

The same non-oriented non-woven fabric as in Example 17 was provided.

A heat-sensitive mimeograph stencil was prepared by the same method as in Example 17 except that the stretching ratios in the longitudinal and transverse directions were 2 times and 2.5 times the original length, respectively.

The stencil was observed with an optical microscope. The supports were in the form of a network in which the fibers were fused to each other and thin membranes spanning the fibers were formed at some of the fused points. The obtained stencils were examined for the number of thin membranes and the various printing characteristics by the methods described above. The results are shown in Table 2.

EXAMPLE 21

Using a rectangular spinneret having 50 holes with a diameter of 0.20 mm, polyethylene terephthalate material $((\eta)=0.65$, Tm=254° C.) was spun at a melting temperature of 290° C. and at an extrusion rate of 50 g/min. The extruded fibers were dispersed and collected on a conveyer at a spinning rate of 1000 m/min using an air ejector to prepare a slightly oriented fabric having a basis weight of 120 g/m$^2$. The average fineness of this non-woven fabric was 4 deniers, the degree of crystallinity was 8% and the index of double refraction ($\Delta$n) was 0.005.

Then a copolymerized polyester resin material containing 86 mol % of polyethylene terephthalate and 14 mol % of polyethylene isophthalate was extruded from a T-die of an extruder having a screw diameter of 40 mm at a die temperature of 280° C. The extruded sheet was cast onto a cooling drum having a diameter of 300 mm to prepare a non-oriented film.

On this non-oriented film, the non-woven fabric prepared as described above was overlaid and the obtained laminate was subjected to thermocompression bonding by supplying the laminate to heating rolls having a temperature of 90° C. to prepare a laminated sheet.

The thus obtained laminated sheet was stretched in the longitudinal direction at a stretching ratio of 3.5 times the original length by heating rolls at 80° C. and then stretched in the transverse direction at 90° C. at a stretching ratio of 3.5 times the original length in a tenter type stretcher. The resultant was heat set in the tenter at 160° C. for 5 seconds to obtain a heat-sensitive mimeograph stencil having a thickness of 60 μm. To the film surface of the stencil, a wax-based releasing agent was applied at the entrance of the tenter with a gravure coater in an amount of 0.1 g/m$^2$ in terms of dry weight.

The basis weight of the fibers of the obtained stencil was 10 g/m$^2$, the average fineness was 1 denier, the thickness of the film alone was 1.2 μm, and the energy of crystal fusion was 7.5 cal/g.

The stencil was observed with an optical microscope. The support was in the form of a network in which the fibers were fused to each other and thin membranes spanning the fibers were formed at some of the fused points. The obtained stencil was examined for the number of thin membranes and the various printing characteristics by the methods described above. The results are shown in Table 2.

EXAMPLE 22

A heat-sensitive mimeograph stencil was prepared in the same manner as in Example 21 except that heat set in the tenter was not carried out.

The stencil was observed with an optical microscope. The support was in the form of a network in which the fibers were fused to each other and thin membranes spanning the fibers were formed at some of the fused points. The obtained stencil was examined for the number of thin membranes and the various printing characteristics by the methods described above. The results are shown in Table 2.

INDUSTRIAL AVAILABILITY

Since the heat-sensitive mimeograph stencil according to the present invention has a support having a uniform shape of openings, the stencil has a stable strength and well balanced retention and permeation of the printing ink. Thus, the printed matter obtained by mimeographing using the stencil has high quality and high clarity and is free from backside transcription. Further, the mimeograph stencil is excellent in ease of transportation. Therefore, the present invention provides a useful heat-sensitive mimeograph stencil.

TABLE 1

| | Support | | | Film | | | Clarity of Characters | Irregularity in Thickness of Rulings | White Spots in Regions Painted in Black |
|---|---|---|---|---|---|---|---|---|---|
| | Number of Thin Membranes (/m$^2$) | Fineness (denier) | Basis Weight (g/m$^2$) | Thickness (μm) | ΔHu (cal/g) | Stencil Thickness (μm) | | | |
| Example 1 | 30 | 0.67 | 5.5 | 2 | 7.7 | 30 | ⊚ | ⊚ | ○ |
| Example 2 | 32 | 0.65 | 6 | 2 | 7.8 | 35 | ⊚ | ⊚ | ○ |
| Example 3 | 28 | 1.44 | 10 | 2 | 7.5 | 60 | ○ | Δ | Δ |
| Example 4 | 12 | 1.4 | 8 | 2 | 5.9 | 60 | ○ | Δ | Δ |
| Example 5 | 21 | 1.4 | 9 | 2 | 8.5 | 60 | ○ | Δ | Δ |
| Example 6 | 3 | 0.65/1.44 | 1.8/10.2 | 2 | 7.7 | 50 | ○ | Δ | Δ |
| Example 7 | 19 | 0.5 | 5 | 2 | 7.7 | 55 | Δ | Δ | Δ |
| Comparative Example 1 | 0 | 1.4 | 10 | 2 | 7.7 | 60 | X | X | X |
| Comparative Example 2 | 0 | 3.0 | 15 | 2 | 7.7 | 80 | X | Δ | X |
| Comparative Example 3 | 0 | | 10 | 2 | 7.7 | 55 | X | Δ | Δ |
| Comparative Example 4 | 0 | 0.67 | 6 | 2 | 7.7 | 33 | Δ | X | Δ |

TABLE 2

| | Support | | | | | | |
|---|---|---|---|---|---|---|---|
| | Number of Thin Membranes (/m²) | Fineness (denier) | Basis Weight (g/m²) | Percentage of Area of Openings (%) | Average Diameter of Equivalent Circle (μm) | Degree of Crystallinity (%) | Index of Double Refraction (Δn) |
| Example 8 | 63 | 0.05 | 10.5 | 10 | 7 | 39 | 0.17 |
| Example 9 | 242 | 0.05 | 17.0 | 4 | 4 | 38 | 0.17 |
| Example 10 | 45 | 0.12 | 3.7 | 54 | 18 | 42 | 0.16 |
| Example 11 | 56 | 0.12 | 8.4 | 29 | 11 | 43 | 0.15 |
| Example 12 | 150 | 0.12 | 12.2 | 9 | 8 | 42 | 0.16 |
| Example 13 | 862 | 0.12 | 21.5 | 6 | 5 | 40 | 0.15 |
| Example 14 | 53 | 0.22 | 4.1 | 57 | 21 | 45 | 0.15 |
| Example 15 | 66 | 0.22 | 8.0 | 33 | 14 | 44 | 0.15 |
| Example 16 | 72 | 0.22 | 11.5 | 12 | 10 | 46 | 0.14 |
| Example 17 | 54 | 0.29 | 3.6 | 60 | 23 | 48 | 0.13 |
| Example 18 | 46 | 0.29 | 7.4 | 36 | 16 | 47 | 0.14 |
| Example 19 | 51 | 0.29 | 10.8 | 14 | 13 | 45 | 0.13 |
| Example 20 | 23 | 0.50 | 8.0 | 30 | 15 | 43 | 0.09 |
| Example 21 | 9 | 1.0 | 10.0 | 20 | 10 | 40 | 0.15 |
| Example 22 | 13 | 1.0 | 10.0 | 19 | 10 | 18 | 0.14 |

| | Support | | Stencil | Clarity of Characters | Irregularity in Thickness of Rulings | White Spots in Regions Painted in Black | Backside Transcription | Ease of Transportation |
|---|---|---|---|---|---|---|---|---|
| | Thickness (μm) | ΔHu (cal/g) | Thickness (μm) | | | | | |
| Example 8 | 1.2 | 7.9 | 38 | ○ | Δ | Δ | ○ | ○ |
| Example 9 | 1.2 | 7.9 | 58 | Δ | Δ | Δ | ○ | ○ |
| Example 10 | 0.6 | 7.9 | 22 | ○ | Δ | Δ | Δ | Δ |
| Example 11 | 1.2 | 7.9 | 30 | ⊚ | ⊚ | ○ | ⊚ | ⊚ |
| Example 12 | 2.0 | 7.9 | 42 | ○ | ○ | ○ | ⊚ | ⊚ |
| Example 13 | 2.0 | 7.9 | 65 | Δ | Δ | Δ | ⊚ | ⊚ |
| Example 14 | 0.6 | 7.9 | 26 | ○ | Δ | Δ | Δ | Δ |
| Example 15 | 1.2 | 7.9 | 32 | ⊚ | ⊚ | ⊚ | ⊚ | ○ |
| Example 16 | 2.0 | 7.9 | 40 | ⊚ | ⊚ | ○ | ○ | ⊚ |
| Example 17 | 0.6 | 7.9 | 28 | ○ | Δ | Δ | Δ | Δ |
| Example 18 | 1.2 | 7.9 | 35 | ⊚ | ⊚ | ⊚ | ○ | ○ |
| Example 19 | 2.0 | 7.9 | 45 | ⊚ | ○ | ○ | ○ | ○ |
| Example 20 | 0.6 | 7.9 | 40 | ○ | Δ | Δ | Δ | Δ |
| Example 21 | 1.2 | 7.5 | 60 | ⊚ | ○ | ○ | ○ | ⊚ |
| Example 22 | 1.2 | 6.0 | 62 | Δ | Δ | ○ | ○ | Δ |

We claim:

1. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers, said polyester film having a thickness of 0.1 to 1.0 μm.

2. The heat-sensitive mimeograph stencil according to claim 1, wherein the melting point (Tm2) of said polyester fibers is not lower than the melting point (Tm1) of said polyester film.

3. A heat-sensitive mimeograph stencil comprising a polyester film having a first surface and an opposing second surface, and a porous support consisting essentially of polyester fibers having an average diameter, said support being laminated on said first surface of said polyester film, wherein said porous support constitutes a network of fibers having fused points formed by fusion of said fibers, and wherein a plurality of membranes are provided which extend between said fibers at some of said fused points, said membranes having thicknesses smaller than the average diameter of said fibers, and wherein the melting point (Tm2) of said polyester fibers is higher than the melting point (Tm1) of said polyester film by not less than 20° C.

4. A heat-sensitive mimeograph stencil comprising a polyester film having a first surface and an opposing second surface, and a porous support consisting essentially of polyester fibers having an average diameter, said support being laminated on said first surface of said polyester film, wherein said porous support constitutes a network of fibers having fused points formed by fusion of said fibers, and wherein a plurality of membranes are provided which extend between said fibers at some of said fused points, said membranes having thicknesses smaller than the average diameter of said fibers, and wherein said porous support is a non-woven fabric consisting essentially of oriented fibers having a fineness of 0.01–10 deniers.

5. A heat-sensitive mimeograph stencil comprising a polyester film having a first surface and an opposing second surface, and a porous support consisting essentially of polyester fibers having an average diameter, said support being laminated on said first surface of said polyester film, wherein said porous support constitutes a network of fibers having fused points formed by fusion of said fibers, and wherein a plurality of membranes are provided which extend between said fibers at some of said fused points, said membranes having thicknesses smaller than the average diameter of said fibers, and wherein said porous support is a non-woven fabric consisting essentially of oriented fibers having a fineness of 0.1–10 deniers.

6. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers and said porous support has a basis weight of 2–20 g/m$^2$.

7. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers and said porous support has a percentage of areas of openings of 5–80%.

8. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers, wherein when openings of said porous support are approximated as circles, the average of the circle diameters is 5–100 $\mu$m.

9. A heat-sensitive mimeograph stencil comprising a polyester film having a first surface and an opposing second surface, and a porous support consisting essentially of polyester fibers having an average diameter, said support being laminated on said first surface of said polyester film, wherein said porous support constitutes a network of fibers having fused points formed by fusion of said fibers, and wherein a plurality of membranes are provided which extend between said fibers at some of said fused points, said membranes having thicknesses smaller than the average diameter of said fibers, and wherein said porous support has a degree of crystallinity of not less than 20%.

10. A heat-sensitive mimeograph stencil comprising a polyester film having a first surface and an opposing second surface, and a porous support consisting essentially of polyester fibers having an average diameter, said support being laminated on said first surface of said polyester film, wherein said porous support constitutes a network of fibers having fused points formed by fusion of said fibers, and wherein a plurality of membranes are provided which extend between said fibers at some of said fused points, said membranes having thicknesses smaller than the average diameter of said fibers, and wherein porous support has an index of double refraction ($\Delta$n) of not less than 0.1.

11. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers and said polyester film is a biaxially oriented film having a thickness of 0.1–10 $\mu$m.

12. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers, wherein said polyester film has an energy of crystal fusion ($\Delta$Hu) of 3–11 cal/g.

13. A heat-sensitive mimeograph stencil comprising a polyester film having a first surface and an opposing second surface, and a porous support consisting essentially of polyester fibers having an average diameter, said support being laminated on said first surface of said polyester film, wherein said porous support constitutes a network of fibers having fused points formed by fusion of said fibers, and wherein a plurality of membranes are provided which extend between said fibers at some of said fused points, said membranes having thicknesses smaller than the average diameter of said fibers, and wherein a releasing agent layer is formed on said second surface of said polyester film, said releasing agent comprising as a major component a mixture of a petroleum wax (A), plant wax (B) and an oily substance (C), which mixture is dissolved, emulsified or suspended in water, the weight ratio (A+B)/C being 100/1 to 1/1.

14. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers, wherein the number of said fused points at which said membranes spanning said fibers are formed is not less than 1 per 1 mm$^2$.

15. A heat-sensitive mimeograph stencil comprising a polyester film having a first surface and an opposing second surface, and a porous support consisting essentially of polyester fibers having an average diameter, said support being laminated on said first surface of said polyester film to form a laminate, wherein said porous support is biaxially stretched and constitutes a network of fibers having fused points formed by fusion of said fibers, and wherein a plurality of membranes formed by the biaxial stretching are provided which extend between said fibers at some of said fused points, said membranes having thicknesses smaller than the average diameter of said fibers, wherein the number of said fused points at which said membranes spanning said fibers are formed is not less than 5 per 1 mm$^2$.

16. A process for producing a heat-sensitive mimeograph stencil comprising:

forming a non-oriented polyester film having a first surface and an opposing second surface, forming a porous support consisting essentially of non-oriented polyester fibers, bonding by thermocompression said porous support to said first surface of said polyester film to form a laminate, and forming a heat-sensitive mimeograph stencil having a plurality of membranes extending between said polyester fibers at a plurality of fused points formed by fusion of said fibers by biaxially co-stretching with heat said polyester film and said porous support of said laminate.

17. A process for producing a heat-sensitive mimeograph stencil comprising:

forming a non-oriented polyester film having a first surface and an opposing second surface, forming a porous support consisting essentially of non-oriented polyester fibers, bonding by thermocompression said porous support to said first surface of said polyester film to form a laminate, and biaxially co-stretching with heat said polyester film and said porous support of said laminate, and after bonding said non-oriented polyester film and said porous support by thermocompression bonding, applying a releasing agent to said second surface of said polyester film before, after or during said biaxial co-stretching.

18. The process according to claim 17, wherein said releasing agent comprises as a major component a mixture of a petroleum wax (A), plant wax (B) and an oil substance (C), which mixture is dissolved, emulsified or suspended in water, the weight ratio (A+B)/C being 100/1 to 1/1.

* * * * *

UNITED STATES PATENT AND TRADEMARK OFFICE
CERTIFICATE OF CORRECTION

PATENT NO. : 5,888,653
DATED : March 30, 1999
INVENTOR(S) : Kawatsu et al

It is certified that error appears in the above-identified patent and that said Letters Patent is hereby corrected as shown below:

In Column 3, line 57, after "out" please insert --an--.

In Column 11, line 8, please change "0" to --10--.

In Column 14, line 9, after "fused" please insert --to--.

In Column 15, line 66, after "fused" please insert --to--.

Signed and Sealed this

Second Day of November, 1999

Attest:

Q. TODD DICKINSON

*Attesting Officer*     *Acting Commissioner of Patents and Trademarks*